United States Patent [19]

Mende

[11] 3,715,434
[45] Feb. 6, 1973

[54] IODOPEPTIDE ANTICOAGULANTS
[75] Inventor: Thomas J. Mende, Miami, Fla.
[73] Assignee: Research Corporation, New York, N.Y.
[22] Filed: April 7, 1970
[21] Appl. No.: 26,425

[52] U.S. Cl. ............424/177, 260/112.5, 260/112 T
[51] Int. Cl. .............................................A61k 27/10
[58] Field of Search ...............260/112 T; 424/5, 177

[56] References Cited

UNITED STATES PATENTS

| | | | |
|---|---|---|---|
| 2,336,022 | 12/1943 | Lefft et al. | 424/5 |
| 2,379,842 | 7/1945 | Turner et al. | 260/112 T |
| 3,455,894 | 7/1969 | Hoover et al. | 260/112 T X |

OTHER PUBLICATIONS

Mende et al. "Synthetic Water-Soluble Macromolecules for Lymphography," pp. 53–54, Proceedings, 2nd Int'l. Congr. Lymphology, Miami Beach, Fla., March 18, 1968, 2 p.m., Paper No. 138.
Mende Pharmacology 4: 309–315 (1970) "Anticoagulant Activity of Synthetic Iodinated Polypeptides."

*Primary Examiner*—Shep K. Rose
*Attorney*—Stowell & Stowell

[57] ABSTRACT

Peptides, when iodinated, exhibit very strong anticoagulant activity.

2 Claims, No Drawings

IODOPEPTIDE ANTICOAGULANTS

The invention described herein was made in the course of work under a grant or award from the Department of Health, Education and Welfare.

This invention relates to iodopeptide anticoagulants.

An anticoagulant is a substance which inhibits the coagulation or clotting of blood usually by prevention of thrombin formation or by preventing the reaction between thrombin and fibrinogen. Decalcifying agents such as oxalate and citrate are used to prevent the coagulation of non-circulating blood intended for clinical laboratory analysis, transfusion, the isolation of various blood factors, etc. Heparin and dicoumarol are administered to inhibit the intravascular clotting of circulating blood in the management of thrombotic conditions. While very effective as anticoagulants, the latter often exhibit toxic or other undesirable side effects on prolonged use. I have now discovered a new class of easy to synthesize anticoagulants having activity comparable to that of heparin but far less expensive with a minimum of associated toxicity and undesirable side effects in the effective range.

More specifically, my invention is a method for inhibiting the coagulation of blood which comprises the intravenous administration of an effective quantity of an iodinated peptide. Particularly preferred are soluble alkali metal salts of the iodopeptides made by iodinating peptides containing aspartic and/or glutamic acid and tyrosine.

The iodopeptides useful in practicing the method of the present invention are most conveniently made by iodinating a tyrosine-containing peptide with iodine-iodide in aqueous alkali such as sodium carbonate or hydroxide. The non-iodinated starting material can be made by conventional methods for peptide synthesis; the direct reaction by thermal fusion of the constituent amino acids disclosed in U.S. Pat. No. 3,052,655 was found to be a simple yet satisfactory approach.

My invention is further described by means of the following non-limiting examples illustrating preferred embodiments thereof:

Equimolar amounts of aspartic acid, glutamic acid and tyrosine are mixed and heated to fusion at about 180°-190°C and the molten reaction mixture kept at that temperature for 4-6 hours. The reaction mixture, after cooling, is dissolved by neutralization with sodium hydroxide and iodinated with iodine and potassium iodide in aqueous solution. The still soluble iodinated product is purified by decolorization of the reaction solution with sodium bisulfite and then precipitated by acidification of the solution to a pH of about 1.0. The cream-colored iodopeptide product is washed with dilute acid and solubilized with sodium hydroxide (other alkali metal hydroxides or ammonia may be utilized). Flash evaporation yields the sodium salt as a dark flaky solid, readily soluble in water.

Analysis indicates the iodopeptide product to be a random co-polymer of the constituent amino acids having an average molecular weight in the range 5,000-6,000 disubstituted with iodine in the aromatic ring of the tyrosine moiety. The structure of the product is indicated as follows:

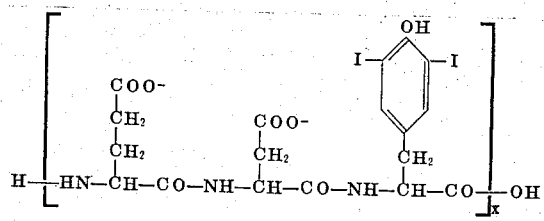

The anticoagulant activity of the iodopeptide product was demonstrated in the rat using saline injected control animals with clotting times ranging from 1'5" to 4'45". Clotting times in the experimental animals, immediately after intravenous administration of the iodopeptide, were more than one hour at a level of 50 mg/kg body weight.

The blood of test animals at a level of 2 mg of synthetic iodopeptide per ml of blood were completely incoagulable. The anticoagulant effect lasted several hours resembling that of heparin; no undesirable side effects were observed.

Similar results were obtained in iodination of a peptide made by fusing glutamic acid with tyrosine (2:1 molar ratio). While tyrosine gave optimal results, polypeptides prepared with histidine as the iodine vehicle also exhibited anticoagulant activity. The relative ratios and absolute amounts of the acidic amino acids and the molecular weight of the peptide are not critical.

I claim:

1. A method for inhibiting the coagulation or clotting of blood in animals whose blood would otherwise clot upon saline injection in the range of from 1 hour and 5 minutes to 4 hours and 45 minutes which comprises the intravenous administration thereto of at least about 50 mg/kg of body weight of an effective anti-blood-coagulent or anti-blood-clotting amount of an water soluble alkali metal salt of an iodinated peptide having the structure:

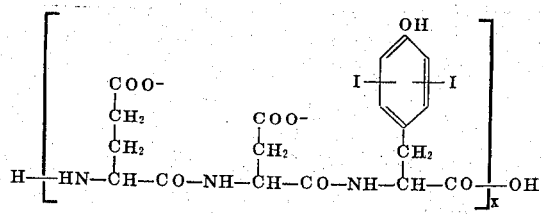

wherein the constituent amino acids consist of equimolar ratios of aspartic acid, glutamic acid and tyrosine and the peptide has an average molecular weight in the range of 5,000-6,000, the blood of said animals being completely incoagulable at a level of 2 mg of said iodinated peptide per ml of blood.

2. A method according to claim 1 wherein the iodinated peptide is administered as its alkali metal salt.